Nov. 14, 1933.     J. E. EUWER     1,935,085
GROUND CLAMP
Filed Nov. 22, 1932     2 Sheets-Sheet 1
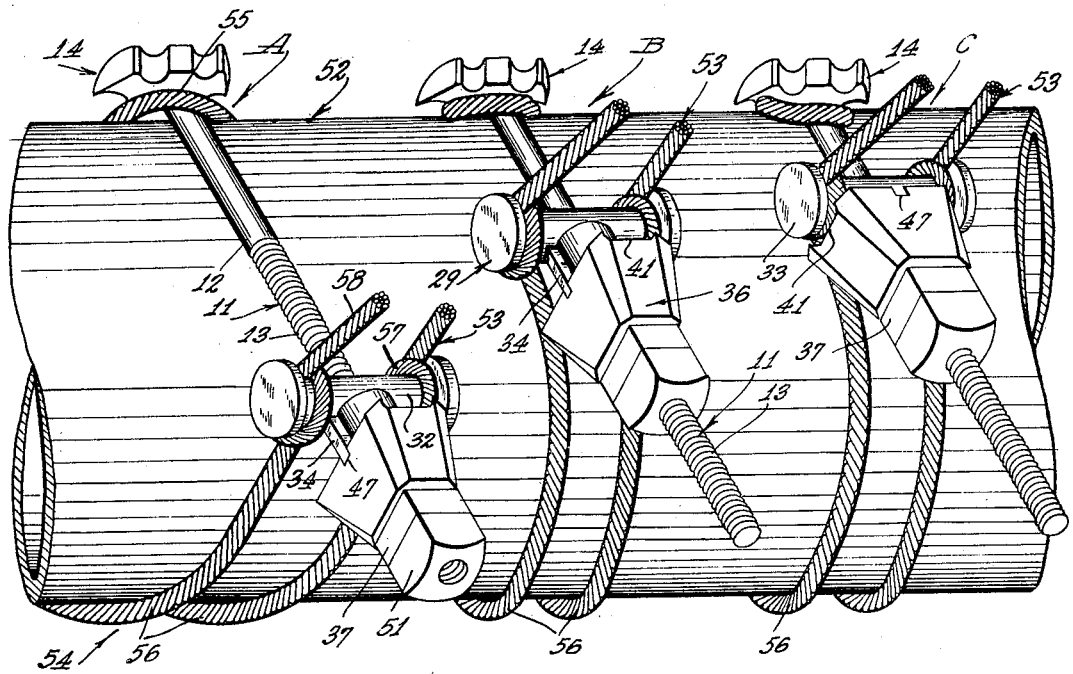
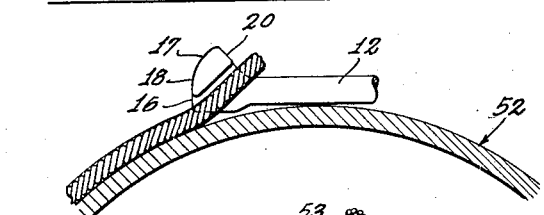
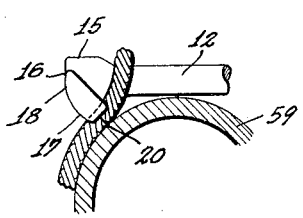
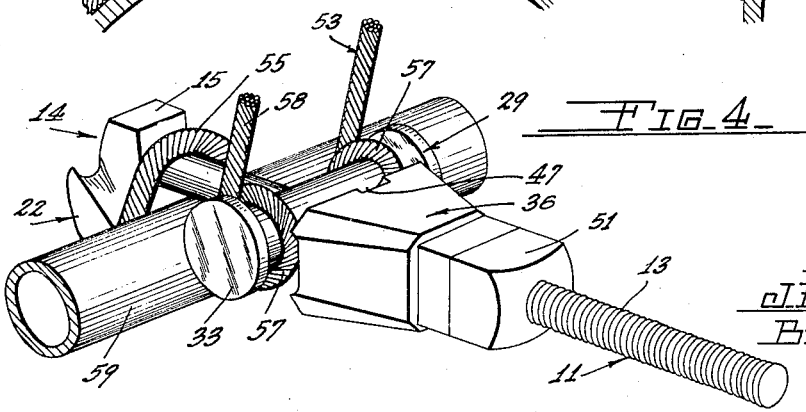
INVENTOR
J. E. EUWER
By Hazard and Miller
ATTORNEYS

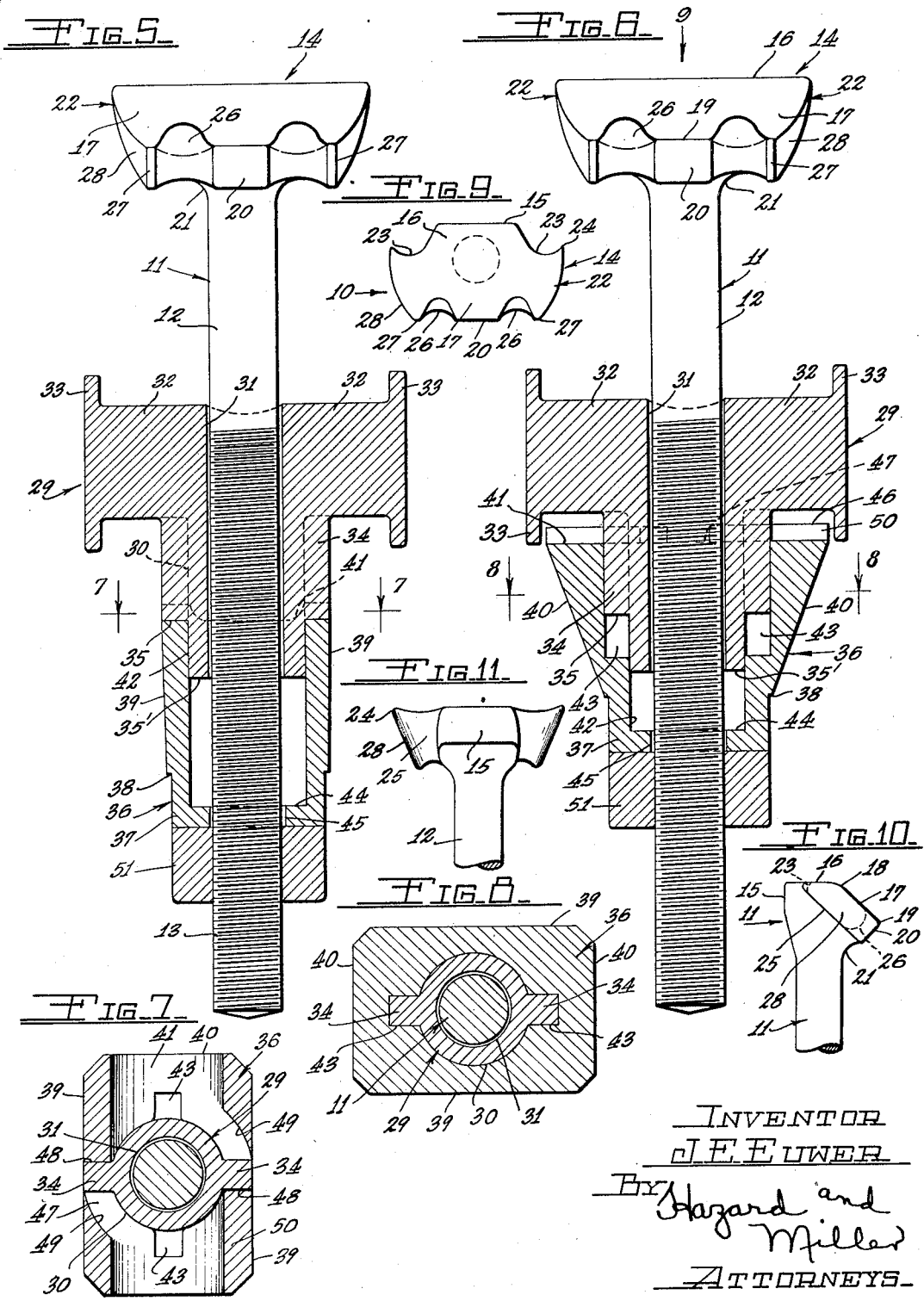

Patented Nov. 14, 1933

1,935,085

UNITED STATES PATENT OFFICE 1,935,085

GROUND CLAMP

James E. Euwer, Los Angeles, Calif.

Application November 22, 1932
Serial No. 643,861

10 Claims. (Cl. 173—273)

My invention relates to a device for mechanically tightening or clamping one or more turns or loops of wire or cable around or partially around a pipe or any other cylindrical object to make a tight electrical connection of a very low resistance between the wire and the pipe without soldering or welding, its primary purpose being for making a ground connection to a pipe adapted to be used for a ground or for connecting a drainage bond to a pipe from which it is desired to take off stray or induced currents.

A feature of this clamp is that the wire is contacted directly to the pipe forming a direct electrical path between the wire and the pipe without passing through the mechanical clamping device.

Another feature in this clamp is that one size and style of clamp can be used universally on pipes of various sizes.

In regard to the particular appliance used an object and feature of the construction is the employment of a bolt with an anchor lead and having two slidable pieces, a snubber spool and a clamping block, operated by means of tightening the nut on the bolt.

An object and feature of this anchor head of the bolt is that when it is used on small pipes the loop can be so placed around it that it will form a close clamping bite on the wire and when it is used on large pipe the bolt is rotated one-half turn and the anchor head holds the loop of the wire so the strain is in line with the bolt.

An object and feature of this snubber spool and clamping block is that they work in conjunction. The snubber spool has a spool portion at right angles to the bolt having a pair of cylindrical sections around which the two ends of the loop of wire may be given one or more turns. The snubber spool also has a body portion extending along the bolt which holds the clamping block clear of the wire when it is first applied. The nut of the bolt is then tightened against the clamping block which in turn forces the snubber spool toward the head of the bolt and tightens the two ends of the loop with a snubbing effect around the snubber spool. When it is tightened in this position until both sides of the loop are tight and slipping around the snubber spool the clamping block is rotated one quarter turn to the left, permitting it to slip over the body portion of the snubber spool and engage the wire around the snubber spool with a clamping effect which will stop any further slipping. The nut of the bolt is then tightened further until the wire is drawn around the pipe at the desired tension.

My invention is illustrated in connection with the accompanying drawings, in which Fig. 1 is a perspective view showing several stages in the use of the ground clamp with the cable.

Fig. 2 is a transverse section through a large tube illustrating the manner of the bight of the cable loop passing over the head of the bolt.

Fig. 3 is a similar section through a small pipe and illustrating the manner in which the bight of the loop passes over the head of the bolt.

Fig. 4 is a perspective view illustrating the cable clamped to a small pipe.

Fig. 5 is a longitudinal section through the snubber spool, clamping block and nut, with the clamping block in one position and showing the bolt in elevation.

Fig. 6 is a similar view in which the clamping block has been rotated one-quarter turn gripping the cable.

Fig. 7 is a transverse section on the line 7—7 of Fig. 5 in the direction of the arrows.

Fig. 8 is a transverse section on the line 8—8 of Fig. 6 in the direction of the arrows.

Fig. 9 is a plan view taken in the direction of the arrow 9 of Fig. 6 showing the head of the bolt.

Fig. 10 is an end elevation taken in the direction of the arrow 10 in Fig. 9.

Fig. 11 is an elevation taken in the direction of the arrow 11 of Fig. 10.

In my invention I employ a bolt 11 which has a non-threaded section 12, a threaded section 13 the major portion of its length, and a head 14. This head has a shouldered offset 15 at the back, a flat top 16, and a downwardly sloping surface 17. This sloping surface is at an angle of substantially 45 degrees to the axis of the bolt and merges with the flat surface 16 by a convex curve 18. The surface 17 terminates at a lower edge 19 and extending inwardly towards the bolt there is a flat surface 20 which at the center is joined by a curved section 21 to the non-threaded portion 12 of the bolt.

The bolt head is provided with two lateral wings 22. On the back having the shoulder 15 there are a pair of curved grooves 23, each groove terminating in a sharp nose 24 formed by the top 16 and the under upwardly sloping surface 25 which is substantially parallel to the top surface 17. The front face 20 is provided with a pair of spaced grooves 26, these being closer together than the grooves 23. Such grooves extend in a rounded curve from the sloping surface 17 on the top of the under sloping surface 25. At the outside of the grooves 26 there are opposite blunt noses 27 from which extend convexly curved substantially vertical side faces 28, each terminating at the sharp nose 24.

The snubber spool 29 has a cylindrical body 30, this having a central bore 31 through which extends the bolt 11. Laterally projecting from the body 30 there are two cylindrical spool sections 32, each having an enlarged flange 33 on the outside. A pair of fins 34 are formed on the body section of the snubber spool. These extend longitudinally and are in alignment with the center of the spool sections 32. These fins terminate at 35 at some distance from the end 35 of the body portion 30.

The clamping block designated at 36 has a squared section 37 at one end and it is provided with a shoulder 38 on all sides of this squared section and from the shoulder there are two long parallel sides 39 and two diverging sloping ends 40. Extending lengthwise of the clamping block there is a groove 41, this being designed to engage the cable as hereinunder detailed.

A cylindrical bore 42 is designed to fit on the cylindrical body 30 but has two opposite longitudinal grooves 43 to engage the fins 34. The cylindrical bore 42 terminates in a shoulder 44 and through this shoulder end there is an opening 45 but sufficiently large to have a sliding fit on the bolt. The end 46 of the clamping block, that is, its broad end, is provided with two diametrically opposite notches 47, each notch having a right angular shoulder 48. An arcuate recess 49 is formed in each of the rims 50 which are formed on opposite sides of the groove 41. On the end of the bolt there is a nut 51 which is preferably squared and of the same size as the squared end 37 of the clamping block.

Referring next to Figs. 1 and 2, illustrations given of the manner of using my invention in connection with a grounding tube 52, which Figs. 1 and 2 illustrate as of large diameter. The electric supply cable 53 is illustrated as having a loop 54 formed of two portions, this loop having a bight 55, the bight being fitted over the bolt adjacent the curved portion 21 on what may be termed the front side of the head of the bolt. This front side, as clearly shown in Fig. 10, has the portion 20 and edge 19 projecting a considerable extent from the periphery of the bolt. This loop has two parallel cable sections 56 which partly encircle the tube 52, each section is given a turn 57 around the spool section 32 of the snubber spool and the two ends 58 of the cable are carried clear of the clamp.

In the manner of using the clamp the clamping block is shifted outwardly on the bolt until the ends 35 of the fins 34 fit in the transverse notches 47 against the shoulder 48. This places the flat opposite faces 39 of the clamping block at right angles to the spool sections 32, as shown in the illustrations A and B of Fig. 1. The nut 51 is then tightened on the bolt, drawing the cable sections 56 around the tube. In this connection the bight 55 having a sharp turn over the bolt cannot slip but the turns 57 of the cable on the spool sections act somewhat as a snubber and if one of the cable sections 56 is looser than the other the snubber turn 57 of the tight section will slip until the tension in these portions 56 is equalized. The equalizing of this tension is readily ascertained as both of the snubber turns 57 will then begin to slip equally.

The clamping block is then given a quarter turn, the fins 34 following in the arcuate recesses 49 until the fins 34 are brought into alignment with the longitudinal grooves 43 in the clamping block. These fins have a sliding fit in these grooves which allows the clamping block to be slid on the bolt towards the head to bring the clamping groove faces 41 against the turn 56 of the cable on the spool sections 32, this being shown in illustration C of Fig. 1 and by the dotted lines of Fig. 6. The nut is then tightened against the squared end of the clamping block and forces this block into as tight an engagement as desired with the turns 56. The clamping block prevents loosening of these turns and the tighter the nut 51 is threaded on the bolt the greater stretch is given to the sections 56 of the cable, thus forming a tight and close electrical contact with the tube 52, which tube as well as the cable have been cleaned to make a good electrical contact.

It will be noted by reference to Fig. 2 that the loop having the cable sections 56 has a pull on the bolt substantially in alignment with the bolt and therefore does not tend to bend the long section of bolt which engages the large tube. Moreover, there is no crimp given to the bight of the cable at the head of the bolt.

In the construction illustrated in Figs. 3 and 4 which is designed for a small pipe 59 the bight 55 is positioned to engage the base of the projecting shoulder 15 of the head.

In the lead of the cable sections over a large pipe these engage in the grooves 23 in the head and are thus prevented from shifting and are held spaced apart so that the bight 55 does not make too sharp a turn.

The two sections 56 of the loop 54 adjacent the bight fit in the grooves 26 in the front of the head, being held quite close together. The snubber turn 57 for each section is given on the spool section of the snubber and a cable is tightened in the manner above described until the slipping is equalized at the snubber, the clamping block is then rotated a quarter of a turn to grip the snubber turns and by a final tightening of the nut the cable is given a stretch to form a tight fit around the small pipe.

In this construction for a small pipe there is such a short length of bolt that although the bight 55 has a pull approximately at right angles to the bolt it cannot bend the bolt. Moreover, the projecting portion of the head with the grooves 23 function as clamping jaws, pressing the cable tight against the pipe, as illustrated in Fig. 3.

It will thus be seen by my construction that the clamp will accommodate substantially any size of cable up to about a half inch in diameter and from pipes as small as say one inch in diameter to much larger sizes.

Another feature of importance is that when the nut is tightened this is usually in a so-called right handed direction by using right hand threads on the bolt and the tightening of the nut tends to rotate the clamping block in a direction to cause the shoulders 48 of the block to bear snugly against the fins 34. There is therefore no danger of the clamping block rotating and slipping while the snubber action is being carried on to equalize the strain on the cable sections. In rotating the clamping block to release this from the fins 34 this is turned in a direction to unscrew the clamping block and the nut, thus loosening the clamping block sufficiently to permit a free quarter turn. Then, when the block is slid into engagement with the snubber turns 57 it may be clamped tightly by means of the nut. Another feature of importance in my invention is that the electrical current through the wire passes directly to the large tube or small pipe and does not pass through the clamp. When the cable is positioned on the tube or pipe the whole assembly may be given a coating of suitable material to prevent corrosion.

Various changes may be made in the principles of my invention without departing from the spirit thereof, as set forth in the description, drawings, and claims.

I claim:

1. A clamp having means to engage a bight of a cable loop, a snubber means engaging a complete turn of each of the portions of the loop, means to tighten said turns and develop a sliding snubber action, and a clamping device to engage and clamp the turns and prevent slippage thereof.

2. A clamp having a bolt, means to engage a bight of a cable loop adjacent one end of the bolt, a snubber device slidable on the bolt and having a cylindrical means to accommodate a circular turn of each side of the loop, means to exert a tension on the two portions of the loop to tighten the said turns and cause a slippage of said turns to equalize the strain on both sides of the bight, and a clamp to engage the turns on the snubber device to prevent slippage of such turns.

3. A clamp as claimed in claim 2, the bight of the loop being engaged on the bolt adjacent the head of the bolt and said head having guide means to engage a portion of two sides of the loop.

4. A clamp having a bolt with a head, a snubber device having a cylindrical section slidable on the bolt, a cable loop extending around a ground connection and having the bight of the loop engaging the bolt adjacent the head, the two side portions of the loop each having a turn around the cylindrical snubber device, means to slide the section of the snubber device on the bolt and develop a tension in the two sections of the loop, a slippage of the said turns to equalize the strain on both sides of the bight, and a clamping block to engage the turns of the loop to prevent slippage of such turns.

5. A clamp as claimed in claim 4, means interengaging the clamping block and the snubber device to hold the clamping block out of engagement with the turns of the cable while the cable sections are being tightened, the said clamping block being rotatable to become disengaged from the said latter means to be brought into direct engagement with the turns on the snubber device.

6. A clamp as claimed in claim 4, the head of the bolt having grooves on opposite sides, the grooves on one side being adapted to engage the cable sections adjacent the bight when used with a large tube, and another set of grooves on the opposite side of the head to engage the cable sections adjacent the bight for use with a small pipe.

7. A clamp having a bolt with a head, a snubber spool slidable on the bolt and having a pair of cylindrical spool sections, a cable having a loop with the bight of the loop engaging the bolt adjacent the head and having two end portions of the loop with a turn around each spool section, a clamping block, means to hold the clamping block spaced from the snubber spool, means to exert a pressure on the clamping block and hence on the spool to tighten the said turns and develop a snubber action until the tension in the two sections of the loop is equalized, the said clamping block being releasable from the means holding the same spaced from the snubber spool and being shiftable on the bolt to directly clamp the turns on the spool to the spool, the said means for exerting a pressure on the clamping block being adapted to again engage the block and transmit pressure direct to the block and the turns to the snubber spool.

8. A clamp as claimed in claim 7, the bolt head having a projecting shoulder on the back and having a pair of lateral wings projecting to one side of the bolt, said wings having a pair of grooves on the back section of the head, and a second pair of grooves on the front section of the head, said grooves being adapted to engage the cable sections of the loop adjacent the bight when used with large or small pipes, said lateral wings being substantially parallel to the snubber spool.

9. A clamp having a bolt with a head, a snubber spool slidable on the bolt and having a pair of cylindrical sections, a clamping block rotatable on a portion of the snubber spool and on the bolt and also slidable in reference to the bolt of the snubber spool, a retaining means to hold the clamping block spaced from the cylindrical sections of the spool, a nut on the bolt engaging one end of the clamping block and adapted to exert a pressure on the clamping block to move the block and the snubber spool towards the head, the said clamping block being releasable from the said retaining means by partial rotation of the said block to bring one end of the block in close relation to the cylindrical sections of the spool, the bolt adjacent the head being adapted to engage a bight of a cable loop, and the cylindrical sections of the spool being adapted to engage a turn of the ends of the loop.

10. A clamp as claimed in claim 9, the head of the bolt having a projecting shoulder on the back and a projection from the bolt on the front and being provided with a pair of lateral wings, the wings on the back having a pair of grooves and also on the front a second pair of grooves, the grooves on the front being closer together than the grooves on the back, said lateral wings being substantially parallel to the snubber spool.

JAMES E. EUWER.